United States Patent [19]

Aldridge et al.

[11] 4,192,735

[45] * Mar. 11, 1980

[54] HYDROCRACKING OF HYDROCARBONS

[75] Inventors: Clyde L. Aldridge; Roby Bearden, Jr., both of Baton Rouge, La.

[73] Assignee: Exxon Research & Engineering Co., Florham Park, N.J.

[*] Notice: The portion of the term of this patent subsequent to Jan. 16, 1996, has been disclaimed.

[21] Appl. No.: 955,797

[22] Filed: Oct. 30, 1978

Related U.S. Application Data

[63] Continuation-in-part of Ser. No. 847,898, Nov. 2, 1977, Pat. No. 4,134,825, which is a continuation-in-part of Ser. No. 702,227, Jul. 2, 1976, abandoned.

[51] Int. Cl.² .................... B01J 27/04; C10G 13/06
[52] U.S. Cl. .......................... 208/112; 208/8; 208/108; 208/114; 208/217; 252/431 C; 252/437; 252/477 R
[58] Field of Search .................... 208/112, 108, 10

[56] References Cited

U.S. PATENT DOCUMENTS

| | | | |
|---|---|---|---|
| 1,876,270 | 9/1932 | Zorn | 252/431 R |
| 2,091,831 | 8/1937 | Pongratz et al. | 208/108 |
| 3,131,142 | 4/1964 | Mills | 208/108 |
| 3,161,585 | 12/1964 | Gleim et al. | 208/264 |
| 3,338,820 | 8/1967 | Wolk et al. | 208/108 |
| 4,090,943 | 5/1978 | Moll et al. | 208/10 |
| 4,125,455 | 11/1978 | Herbstman | 208/108 |
| 4,134,825 | 1/1979 | Bearden et al. | 208/108 |
| 4,136,013 | 1/1979 | Moll et al. | 208/10 |

OTHER PUBLICATIONS

Bureau of Mines Bulletin 622 (1965), pp. 24–28.

Primary Examiner—Delbert E. Gantz
Assistant Examiner—G. E. Schmitkons
Attorney, Agent, or Firm—Marthe L. Gibbons

[57] ABSTRACT

A catalytic hydrocracking process for a hydrocarbonaceous oil is effected by dispersing a thermally decomposable metal compound in the oil, heating the compound in the presence of a hydrogen-containing gas to form a solid, non-colloidal catalyst within the oil and reacting the oil containing the catalyst with hydrogen. Preferred thermally decomposable compound are molybdenum compounds.

24 Claims, 1 Drawing Figure

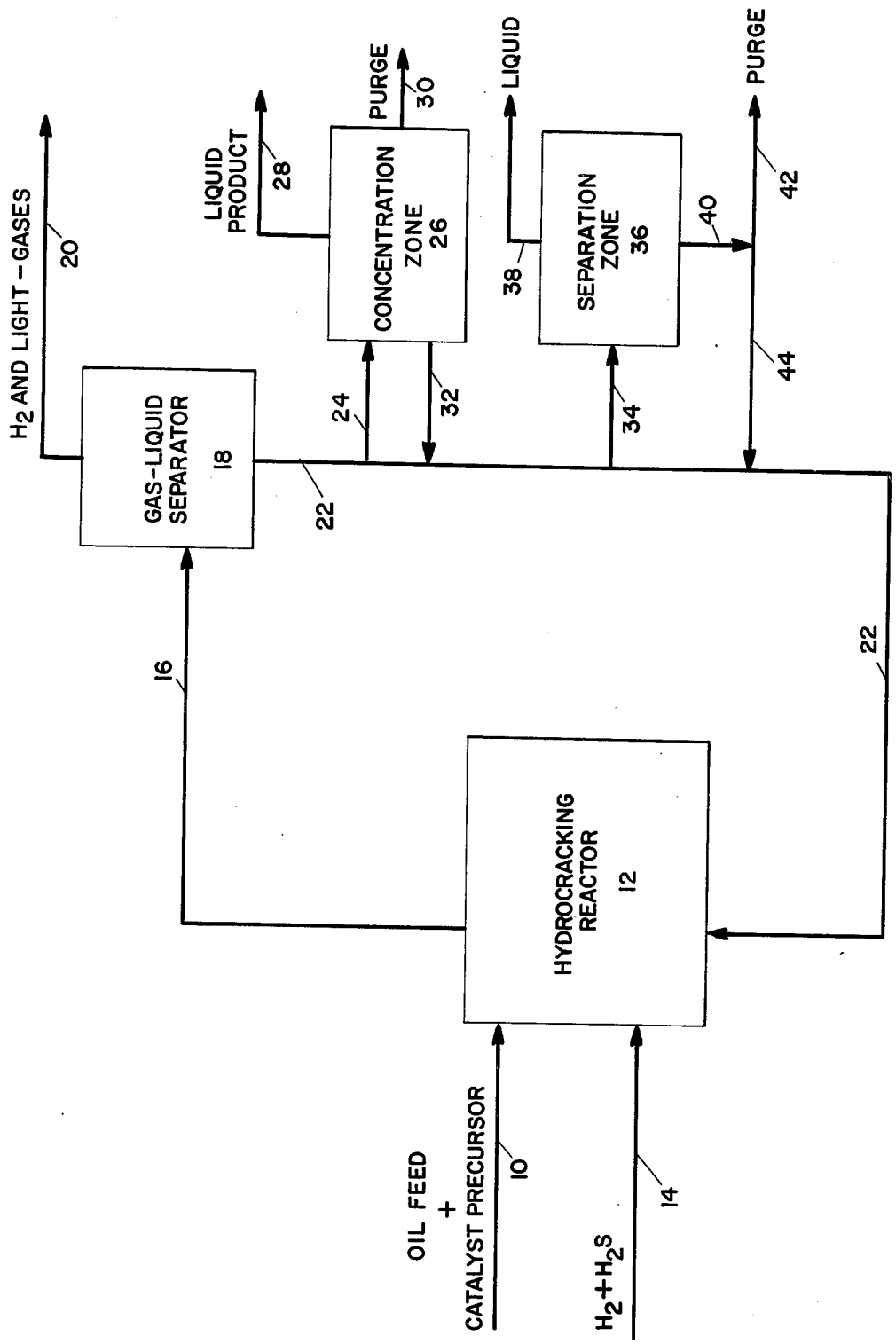

HYDROCRACKING OF HYDROCARBONS

CROSS REFERENCE TO RELATED APPLICATIONS

This application is a continuation-in-part of U.S. application Ser. No. 847,898 filed Nov. 2, 1977 (now U.S. Pat. No. 4,134,825), which in turn is a continuation-in-part of U.S. application Ser. No. 702,227 filed July 2, 1976, now abandoned, the teachings of both of which are hereby incorporated by specific reference.

BACKGROUND OF THE INVENTION

1. Field of the Invention

This invention relates to a process for the hydrocracking of a hydrocarbonaceous oil to lower boiling hydrocarbon products in the presence of a catalyst prepared in situ from metals added to the oil as thermally decomposable metal compounds.

2. Description of the Prior Art

Hydrorefining processes utilizing dispersed catalysts in admixture with a hydrocarbonaceous oil are well known. The term "hydrorefining" is intended herein to designate a catalytic treatment, in the presence of hydrogen, of a hydrocarbonaceous oil to upgrade the oil by eliminating or reducing the concentration of contaminants in the oil such as sulfur compounds, nitrogenous compounds, metal contaminants and/or to convert at least a portion of the heavy constituents of the oil such as pentane-insoluble asphaltenes or coke precursors to lower boiling hydrocarbon products, and to reduce the Conradson carbon residue of the oil.

U.S. Pat. No. 3,161,585 discloses a hydrorefining process in which a petroleum oil chargestock containing a colloidally dispersed catalyst selected from the group consisting of a metal of Groups VB and VIB, an oxide of said metal and a sulfide of said metal is reacted with hydrogen at hydrorefining conditions. This patent teaches that the concentration of the dispersed catalyst, calculated as the elemental metal, in the oil chargestock is from about 0.1 weight percent to about 10 weight percent of the initial chargestock.

U.S. Pat. No. 3,331,769 discloses a hydrorefining process in which a metal component (Group VB, Group VIB, iron group metal) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2,500 weight parts per million (wppm).

U.S. Pat. No. 3,657,111 discloses a process for hydrorefining an asphaltene-containing hydrocarbon chargestock which comprises dissolving in the chargestock a hydrocarbon-soluble oxovanadate salt and forming a colloidally dispersed catalytic vanadium sulfide in situ within the chargestock by reacting the resulting solution, at hydrorefining conditions, with hydrogen and hydrogen sulfide.

U.S. Pat. No. 3,131,142 discloses a slurry hydrocracking process in which an oil soluble dispersible compound of Groups IV to VIII is added to a heavy oil feed. The catalyst is used in amounts ranging from 0.1 to 1 weight percent, calculated as the metal, based on the oil feed.

U.S. Pat. No. 1,876,270 discloses the use of oil soluble organometallic compounds in thermal cracking or in destructive hydrogenation (hydrocracking) of hydrocarbons to lower boiling products.

U.S. Pat. No. 2,091,831 discloses cracking or destructive hydrogenation carried out in the presence of oil soluble salts of acid organic compounds selected from the group consisting of carboxylic acids and phenols with a metal of Group VI and Group VIII of the Periodic Table. The oil soluble salt is used in amounts between 4 and 20 weight percent based on the feed.

It has now been found that the addition of a minor amount (i.e. less than 1000 weight parts per million (wppm), calculated as the metal) of a thermally decomposable compound of metals of Groups IVB, VB, VIB, VIIB and VIII of the Periodic Table of Elements and their conversion products in the oil yield catalysts which are effective in a minor amount for the hydrocracking of hydrocarbonaceous oils to lower boiling hydrocarbon products. Furthermore, the process of the present invention can be conducted with less hydrogen consumption than in typical conventional hydrocracking processes.

SUMMARY OF THE INVENTION

In accordance with the invention, there is provided a process for hydrocracking a hydrocarbon oil chargestock having a Conradson carbon content of less than about 5 weight percent which comprises: (a) adding to said chargestock a thermally decomposable metal compound in an amount ranging from about 25 to about 950 wppm, calculated as the elemental metal based on said chargestock, said metal being selected from the group consisting of Groups IVB, VB, VIB, VIIB and VIII of the Periodic Table of Elements and mixtures thereof; (b) heating said thermally decomposable metal compound within said chargestock in the presence of a gas selected from the group consisting of a hydrogen-containing gas, a hydrogen sulfide-containing gas and a gas comprising hydrogen and hydrogen sulfide to produce a solid, noncolloidal catalyst within said chargestock, said solid catalyst comprising from about 25 to about 950 wppm of said metal, calculated as the elemental metal, based on said chargestock; (c) reacting the chargestock containing said catalyst with hydrogen under hydrocracking conditions, and (d) recovering a hydrocracked hydrocarbon oil.

BRIEF DESCRIPTION OF THE DRAWING

The FIGURE is a schematic flow plan of one embodiment of the invention.

DETAILED DESCRIPTION OF THE INVENTION

The process of the invention is generally applicable to hydrocarbonaceous oils boiling, at atmospheric pressure, in the range of about 430° F. to 1100° F., preferably in the range of about 500° F. to about 1050° F., more preferably in the range of about 650° F. to 1050° F. These hydrocarbon oils may be derived from any source such as petroleum, oil shale, tar sands, coal liquids. The Conradson carbon residue of these oils will generally range below 5 weight percent, preferably below 2 weight percent (as to Conradson carbon residue see ASTM test D-189-65). By way of example, suitable hydrocarbon oil feeds for the process of the present invention include virgin gas oil, vacuum gas oil, coker gas oil, visbreaker gas oil, petroleum distillates, hydrocarbon oils derived from coal liquefaction processes, etc. and mixtures thereof. Preferably the oil is a mixture of hydrocarbons boiling, at atmospheric pressure, in the range of about 650° F. to 1050° F. More preferably, the hydrocarbon oil is a substantially asphaltene-free oil. By "substantially asphaltene-free" is intended herein that the oil comprises less than about 1.0 weight percent asphaltenes.

To the hydrocarbon oil chargestock is added from about 25 to about 950 wppm, preferably from about 50 to about 300 wppm, more preferably from about 50 to about 200 wppm of a metal as a thermally decomposable metal compound, wherein the metal is selected from the group consisting of Groups IVB, VB, VIB, VIIB, VIII and mixtures thereof of the Periodic Table of Elements, based on the initial chargestock.

Suitable thermally decomposable metal compounds convertible (under process conditions) to solid, non-colloidal catalyst include (1) inorganic metal compounds such as halides, oxyhalides, poly acids such as isopoly acids and heteropoly acids (e.g. phosphomolybdic acid, molybdosilicic acid); (2) metal salts of organic acids such as acyclic and alicyclic aliphatic carboxylic acids containing two or more carbon atoms (e.g. naphthenic acids); aromatic carboxylic acids (e.g. toluic acid); sulfonic acids (e.g. toluenesulfonic acid); sulfinic acids; mercaptans, xanthic acid, phenols, di and polyhydroxy aromatic compounds; (3) organometallic compounds such as metal chelates, e.g. with 1,3-diketones, ethylene diamine, ethylene diamine tetraacetic acid, phthalocyanines, etc.; (4) metal salts of organic amines such as aliphatic amines, aromatic amines, and quaternary ammonium compounds.

The metal constituent of the thermally decomposable metal compound, that is convertible to a solid, non-colloidal catalyst, is selected from the group consisting of Groups IVB, VB, VIB, VIIB and VIII and mixtures thereof of the Periodic Table of Elements, in accordance with the table published by E. H. Sargent and Company, copyright 1962, Dyna Slide Company, that is, titanium, zirconium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the thermally decomposable metal compound is selected from the group consisting of molybdenum, vanadium and chromium. More preferably, the metal constituent of the thermally decomposable metal compound is selected from the group consisting of molybdenum and chromium. Most preferably, the metal constituent of the thermally decomposable compound is molybdenum. Preferred compounds of the given metals include the salts of acyclic (straight or branched chain) aliphatic carboxylic acids, salts of alicyclic aliphatic carboxylic acids, heteropoly acids, carbonyls, phenolates and organo amine salts. The more preferred metal compounds are salts of an alicyclic aliphatic carboxylic acid such as metal naphthenates. The most preferred compounds are molybdenum naphthenate, vanadium naphthenate, chromium naphthenate and phosphomolybdic acid.

When the thermally decomposable metal compound is added to the hydrocarbonaceous chargestock, it first disperses in the oil and subsequently, under pretreatment or under hydroconversion conditions herein described, is converted to a solid, non-colloidal catalyst comprising from about 25 to about 950 wppm, preferably from about 50 to about 300 wppm, more preferably from about 50 to about 200 wppm of the same metal or metals as the metal or metals added as thermally decomposable compound, calculated as the elemental metal, based on the oil chargestock.

Various methods can be used to convert the dispersed compound in the oil. One method (pre-treatment method) of forming a catalyst from the thermally decomposable compound of the present invention is to heat the solution of the metal compound in the hydrocarbon chargestock to a temperature ranging from about 325° C. to about 415° C. and at a pressure ranging from about 500 to about 5000 psig in the presence of a gas selected from the group consisting of a hydrogen-containing gas, a hydrogen sulfide-containing gas and a gas comprising hydrogen and hydrogen sulfide. Preferably, the gas comprises hydrogen and hydrogen sulfide. The hydrogen sulfide may comprise from about 1 to about 90 mole percent, preferably from about 2 to about 50 mole percent, more preferably from about 3 to about 30 mole percent, of the hydrogen-containing gas mixture. The thermal treatment in the presence of the gas is believed to convert the metal compound to the corresponding metal-containing solid, non-colloidal products which are catalytically active and act as coking inhibitors. The resulting catalyst contained within the oil charge is then introduced into a hydrocracking zone which will be subsequently described.

A preferred method of converting the thermally decomposable metal compound of the present invention is to react the dispersion of the compound in oil with a hydrogen-containing gas at hydrocracking conditions to produce the catalyst in the chargestock in situ in the hydroconversion zone. Preferably, the hydrogen-containing gas comprises from about 1 to about 10 mole percent, more preferably from about 2 to 7 mole percent, hydrogen sulfide. The conversion of the metal compound in the presence of the hydrogen-containing gas or in the presence of the hydrogen and hydrogen sulfide is believed to produce the corresponding metal-containing solid, non-colloidal catalyst. Whatever the exact nature of the resulting metal-containing catalyst, the resulting metal component is a catalyst agent and a coking inhibitor.

When a thermally decomposable molybdenum compound is used as the catalyst precursor, the preferred method of converting the thermally decomposable metal compound is in situ in the hydroconversion zone, without any pretreatment.

The hydrocracking zone is maintained at a temperature ranging from about 700° F. to 1000° F., preferably from about 800° to 900° F., and at a total pressure ranging from about 100 to 5000 psig, preferably from about 500 to 3000 psig. Hydrogen is introduced into the reaction zone at a rate of about 300 to about 5000 standard cubic feet per barrel, preferably at a rate of about 500 to 1000 standard cubic feet per barrel of hydrocarbonaceous oil. Reaction time may vary widely. Suitable reaction times include from about 5 minutes to about 4 hours, preferably from about 10 minutes to 2 hours depending upon the desired degree of conversion. Contact of the dispersion under the hydrocracking conditions in the reaction zone with the hydrogen-containing gas converts the metal compound to the corresponding metal catalyst in situ while simultaneously producing a hydrocracked oil. The hydrocracked oil containing solids is removed from the hydrocracking reaction zone. The solids may be separated from the hydrocracked oil by conventional means, for example, by settling or centrifuging or filtration of the slurry. At least a portion of the separated solids or solids concentrate may be recycled directly to the hydrocracking zone or recycled to the hydrocarbonaceous oil chargestock. The process of the invention may be conducted either as a batch or as a continuous type operation.

DESCRIPTION OF THE PREFERRED EMBODIMENT

The preferred embodiment will be described with reference to the accompanying FIGURE.

Referring to the FIGURE, a gas oil feed having an atmospheric pressure boiling point of from about 650° F. to 1050° F. containing less than 500 wppm of a metal added as thermally decomposable metal compound, preferably molybdenum naphthenate or phosphomolybdic acid, based on the initial gas oil feed, is introduced by line 10 into a hydrocracking reactor 12 at a space velocity of 0.5 to 2 volumes of feed per hour per volume of reactor. A gaseous mixture comprising hydrogen and from about 2 to 7 mole percent hydrogen sulfide is introduced into reactor 12 by line 14. The hydrocracking reaction zone in reactor 12 is maintained at a temperature ranging from about 800° to 900° F. and at a total pressure of about 500 to about 5000 psig with a hydrogen feed rate of about 500 to 3000 standard cubic feet per barrel. The hydrocracking reactor effluent is removed by line 16. The effluent comprises a hydrocracked oil product, gases, and a solid residue.

The effluent is introduced into a gas-liquid separator 18 where hydrogen and light hydrocarbons are removed overhead through line 20. Three preferred process options are available for the liquid stream containing dispersed catalyst solids which emerges from separator vessel 18 via line 22. In process option to be designated "A," the liquid-solids stream is fed by line 24 to concentration zone 26 where by means, for example, of distillation or centrifugation, the stream is separated into a clean liquid product, which is withdrawn through line 28, and a concentrated solids slurry (i.e. 20 to 40% by weight solids) in oil. At least a portion of the concentrated slurry can be removed as a purge stream through line 30, to control the buildup of solid materials in the hydrocracking reactor, and the balance of the slurry is returned by line 32 and line 22 to hydrocracking reactor 12. The purge stream may be filtered subsequently to recover catalyst and liquid product or it can be burned or gasified to provide, respectively, heat and hydrogen for the process.

In the process option to be designated "B," the purge stream from concentration zone 26 is omitted and the entire slurry concentrate withdrawn through line 32 is fed to separation zone 36 via lines 22 and 34. In this zone, a major portion of the remaining liquid phase is separated from the solids by means of centrifugation, filtration or a combination of settling and drawoff, etc. Liquid is removed from the zone through line 38 and solids through line 40. At least a portion of the solids and associated remaining liquid are purged from the process via line 42 to control the build-up of solids in the process and the balance of the solids are recycled to hydrocracking reactor 12 via line 44 which connects to recycle line 22. The solids can be recycled either as recovered or after suitable cleanup (not shown) to remove heavy adhering oil deposits and coke.

In option designated "C," the slurry of solids in oil exiting from separator 18 via line 22 is fed directly to separation zone 36 by way of line 34 whereupon solids and liquid product are separated by means of centrifugation or filtration. All or part of the solids exiting from vessel 36 via line 40 can be purged from the process through line 42 and the remainder recycled to the hydrocracking reactor. Liquid product is recovered through line 38. If desired, at least a portion of the heavy fraction of the hydrocracked oil product may be recycled to the hydrocracking zone.

The following examples are presented to illustrate the invention.

EXAMPLE 1

A light Arabian vacuum gas oil feed having a Conradson carbon content of 0.46 weight percent; 2.34 weight percent sulfur and an API gravity at 60° F. of 22.4 was hydrocracked at 840° F. under a total pressure of 2700 to 3900 psig with a hydrogen charge of 1000 standard cubic feet per barrel of feed. Molybdenum naphthenate was utilized in the first run and recycled solids in the three subsequent runs. The results of this experiment are summarized in Table I.

TABLE I

| GAS OIL HYDROCRACKING | | | | | |
|---|---|---|---|---|---|
| 840° F., 28 Min., 2000 psig H$_2$ Charged at Room Temperature | | | | | |
| Feed Light Arab VGO, 2.4% S | | | | | |
| Run No. | 23L | 24L | 26L | 27L | 28L |
| Mo, wppm added | — | 934 | 934 | 933 | 933 |
| as | — | Mo Naph | Solids 24L | Solids 26L | Solids 27L |
| Conversion, Wt. % | 50.7 | 47.8 | 48.0 | 46.8 | 45.1 |
| Liq. Product | | | | | |
| Br. No. | 15.2 | 5.8 | 6.1 | 6.0 | 6.7 |
| S, % | 2.08 | 1.16 | 1.17 | 1.21 | 1.31 |
| H$_2$ Consumption, SCF/bbl. | 300 | 489 | 476 | 463 | 402 |
| Mid Distillate/Naphtha | | | | | |
| Wt. Ratio | 2.35 | 3.09 | 3.05 | 2.92 | 3.01 |
| C$_1$-C$_3$ Yield, Wt. % | 1.63 | 1.37 | 1.38 | 1.40 | 1.31 |

| Distillation Fraction Analyses | |
|---|---|
| (Runs 24L, 26L, 27L, 28L Combined) | |
| Feed | |
| Sulfur, % | 2.34 |
| API Gravity at 60° F. | 22.4 |
| Conradson Carbon, Wt. % | 0.46 |
| Products | |
| Naphtha | |
| Surfur, % | 0.10 |
| Bromine No. | 6.8 |

TABLE I-continued

| | |
|---|---|
| Mid Distillate | |
| Sulfur, % | 0.6 |
| Br. No. | 5 |
| 650° F. + Bottoms | |
| Sulfur, % | 1.2 |
| Br. No. | 4.0 |
| API Gravity at 60° F. | 24.7 |

EXAMPLE 2

Another set of experiments was performed at an average total pressure of about 3200 psig, at a temperature of 840° F. for 30 minutes utilizing the same light Arab virgin gas oil feed that was utilized in Example 1. The hydrogen charge amounted to 1500 standard cubic feet per barrel of feed. One run was a control run conducted in the absence of added catalyst in a batch reactor completely free of traces of molybdenum that ordinarily coat the surfaces of reactors wherein catalyst are generated in situ from oil soluble molybdenum compounds. Another run, which was in accordance with the invention, utilized 520 wppm molybdenum based on the oil feed. The molybdenum was added to the feed as molybdenum naphthenate. The results of this set of experiments are summarized in Table II.

TABLE II

| Run No. | 08-R-56 | 08-R-65 |
|---|---|---|
| Catalyst Precursor | None | Mo Naphthenate |
| Mo on Feed, wppm | None | 520 |
| Yields, Wt. % on Feed | | |
| $C_1$-C;Hd 4 | 3.1 | 1.9 |
| Coke | Nil | Nil |
| $H_2$ Consumed, SCF/bbl | 389 | 629 |
| Liquid Products Inspection | | |
| Sulfur, Wt. % | 2.4 | 1.6 |
| Bromine No. | 16.8 | 10.5 |
| 650° F. + Conversion, % | 62.7 | 45.5 |
| Distillate/Naphtha, wt. ratio (355– (i–355° F.) 650° F.) | 2.1 | 3.4 |

As can be seen from the above data, the run (08-R-65) in accordance with the present invention resulted in a controlled conversion reaction wherein the liquid product obtained exhibited a substantially lower sulfur content, a higher level of saturation (lower bromine number) and a desirably higher middle distillate to naphtha ratio than obtained in the control run (08-R-56).

What is claimed is:

1. A process for hydrocracking a hydrocarbon oil chargestock having a Conradson carbon content of less than about 5 weight percent, which comprises:
    (a) adding to said chargestock a thermally decomposable metal compound in an amount ranging from about 25 to about 950 weight parts per million, calculated as the elemental metal, based on said oil chargestock, said metal being selected from the group consisting of Groups IVB, VB, VIB, VIIB and VIII of the Periodic Table of Elements and mixtures thereof;
    (b) heating said thermally decomposable metal compound within said chargestock in the presence of a gas selected from the group consisting of a hydrogen-containing gas, a hydrogen sulfide-containing gas, and a gas comprising hydrogen and hydrogen sulfide, to produce a solid, non-colloidal catalyst within said chargestock, said solid catalyst comprising from about 25 to about 950 wppm of said metal, calculated as the elemental metal, based on said chargestock;
    (c) reacting the chargestock containing said catalyst with hydrogen under hydrocracking conditions, in a hydrocracking zone, and
    (d) recovering a hydrocracked hydrocarbon oil.

2. The process of claim 1 wherein said thermally decomposable metal compound is selected from the group consisting of inorganic metal compounds, salts of organic acids, organometallic compounds and salts of organic amines.

3. The process of claim 1 wherein said thermally decomposable metal compound is selected from the group consisting of salts of acyclic aliphatic carboxylic acids and salts of alicyclic aliphatic carboxylic acids.

4. The process of claim 1 wherein said thermally decomposable metal compound is a salt of a naphthenic acid.

5. The process of claim 1 wherein the metal constituent of said thermally decomposable metal compound is selected from the group consisting of molybdenum, chromium and vanadium.

6. The process of claim 1 wherein said thermally decomposable metal compound is molybdenum naphthenate.

7. The process of claim 1 wherein said thermally decomposable metal compound is phosphomolybdic acid.

8. The process of claim 1 wherein said gas of step (b) is a hydrogen-containing gas.

9. The process of claim 1 wherein said gas of step (b) is a hydrogen sulfide-containing gas.

10. The process of claim 1 wherein said gas of step (b) is a gas comprising hydrogen and hydrogen sulfide.

11. The process of claim 10 wherein said gas of step (b) comprises from about 1 to 90 mole percent hydrogen sulfide.

12. The process of claim 10 wherein said hydrogen-containing gas of step (b) comprises from about 1 to 10 mole percent hydrogen sulfide.

13. The process of claim 1 wherein said thermally decomposable metal compound is converted to said solid non-colloidal catalyst by first heating the oil chargestock containing the added thermally decomposable metal compound to a temperature ranging from about 325° C. to about 415° C. in the presence of said gas to form a catalyst within said oil chargestock and subsequently reacting the oil containing said catalyst with hydrogen under hydrocracking conditions.

14. The process of claim 13 wherein said thermally decomposable metal compound is converted to said solid, non-colloidal catalyst in the presence of a gas comprising hydrogen and hydrogen sulfide.

15. The process of claim 1 wherein said thermally decomposable metal compound is converted to said solid non-colloidal catalyst in the presence of a hydrogen-containing gas under hydrocracking conditions thereby forming said catalyst in situ in said oil in said hydrocracking zone and producing a hydrocracked oil.

16. The process of claim 1 wherein said hydrocracking conditions include a temperature ranging from about 700° to 1000° F. and a total pressure ranging from about 500 to about 5000 psig.

17. The process of claim 1 wherein the reaction product resulting from step (c) comprises a hydrocracked oil containing solids, the additional steps which comprise separating at least a portion of said solids from said hydrocracked oil and recycling at least a portion of said solids to step (a) or to step (c).

18. The process of claim 1 wherein said catalyst is the sole catalyst in said hydrocracking zone.

19. The process of claim 1 wherein said hydrocarbon oil chargestock has an atmospheric pressure boiling point in the range of about 430° F. to 1100° F.

20. The process of claim 1 wherein said hydrocarbon oil chargestock has an atmospheric pressure boiling point ranging from about 650° F. to about 1050° F.

21. A process for hydrocracking a hydrocarbon oil chargestock having a Conradson carbon content of less than about 5 wt. %, which comprises:
   (a) adding to said oil chargestock a thermally decomposable molybdenum compound in an amount ranging from about 25 to about 950 weight parts per million, calculated as elemental molybdenum, based on said oil chargestock;
   (b) converting said molybdenum compound to a solid, non-colloidal catalyst in situ within said chargestock by reacting the resulting dispersion with a hydrogen-containing gas in a hydrocracking zone under hydrocracking conditions including a temperature ranging from about 800° to 900° F. and a total pressure ranging from about 500 psig to about 3000 psig, said solid catalyst comprising from about 25 to about 950 wppm of said molybdenum, calculated as the elemental metal, based on said chargestock; and
   (c) recovering a hydrocracked oil.

22. The process of claim 21 wherein said hydrogen-containing gas comprises from about 2 to about 7 mole percent hydrogen sulfide.

23. In the process of claim 21 wherein the effluent of said hydrocracking zone comprises a hydrocracked oil and solids, the improvement which comprises the additional steps of separating at least a portion of said solids from said effluent and recycling at least a portion of the separated solids to said hydrocracking zone.

24. The process of claim 1 or 21 wherein said hydrocarbon oil chargestock has a Conradson content of less than about 2 weight percent.

* * * * *